United States Patent [19]
Mathews et al.

[11] Patent Number: 5,363,923
[45] Date of Patent: Nov. 15, 1994

[54] FLIP UP ROW FOLLOWER

[75] Inventors: H. Wayne Mathews, Denison; Ronny L. Barnes, O'Donnell, both of Tex.

[73] Assignee: Gar Bar Corporation, O'Donnell, Tex.

[21] Appl. No.: 60,868

[22] Filed: May 13, 1993

[51] Int. Cl.⁵ .............................................. A01B 69/00
[52] U.S. Cl. ........................................ 172/6; 280/776
[58] Field of Search ................ 172/6, 26, 5, 233, 234; 104/244.1, 245; 56/10.2, 10.4; 171/9; 280/776

[56] References Cited

U.S. PATENT DOCUMENTS

| | | | |
|---|---|---|---|
| 4,197,691 | 4/1980 | Woodruff | 56/10.2 R |
| 4,414,903 | 11/1983 | Fasse et al. | 172/26 X |
| 5,040,613 | 8/1991 | Dodd et al. | 172/26 X |
| 5,121,799 | 6/1992 | Barnes et al. | 172/6 |
| 5,148,873 | 9/1992 | Barnes et al. | 172/26 X |
| 5,185,990 | 2/1993 | Barnes et al. | 104/244.1 X |

FOREIGN PATENT DOCUMENTS 264277 6/1970 U.S.S.R. .................................... 172/6

Primary Examiner—Randolph A. Reese
Assistant Examiner—Christopher J. Novosad
Attorney, Agent, or Firm—Wendell Coffee

[57] ABSTRACT

A carrier for a row follower is pivoted to the front of an agricultural tractor by a horizontal carrier pivot which is at right angles to the direction of travel of the tractor. This pivot permits the carrier to pivot away from the tractor in the event the tractor is reversed in direction of travel while the row follower is in the operating position. The row follower is connected to an encoder housing. The encoder housing is mounted upon an assembly pivot bolt so that it may be tilted to a carry position which raises to horizontal position, a shank which carries the row follower. The tilting of the encoder is accomplished by a solenoid which is primarily controlled from the cab of the tractor. The row follower shank is biased to be in a position aligned with the direction of travel. Also, the row follower shank is limited by the prongs of a fork to a maximum limited deviation from the alignment with the direction of travel so that it does not swing wildly.

19 Claims, 3 Drawing Sheets

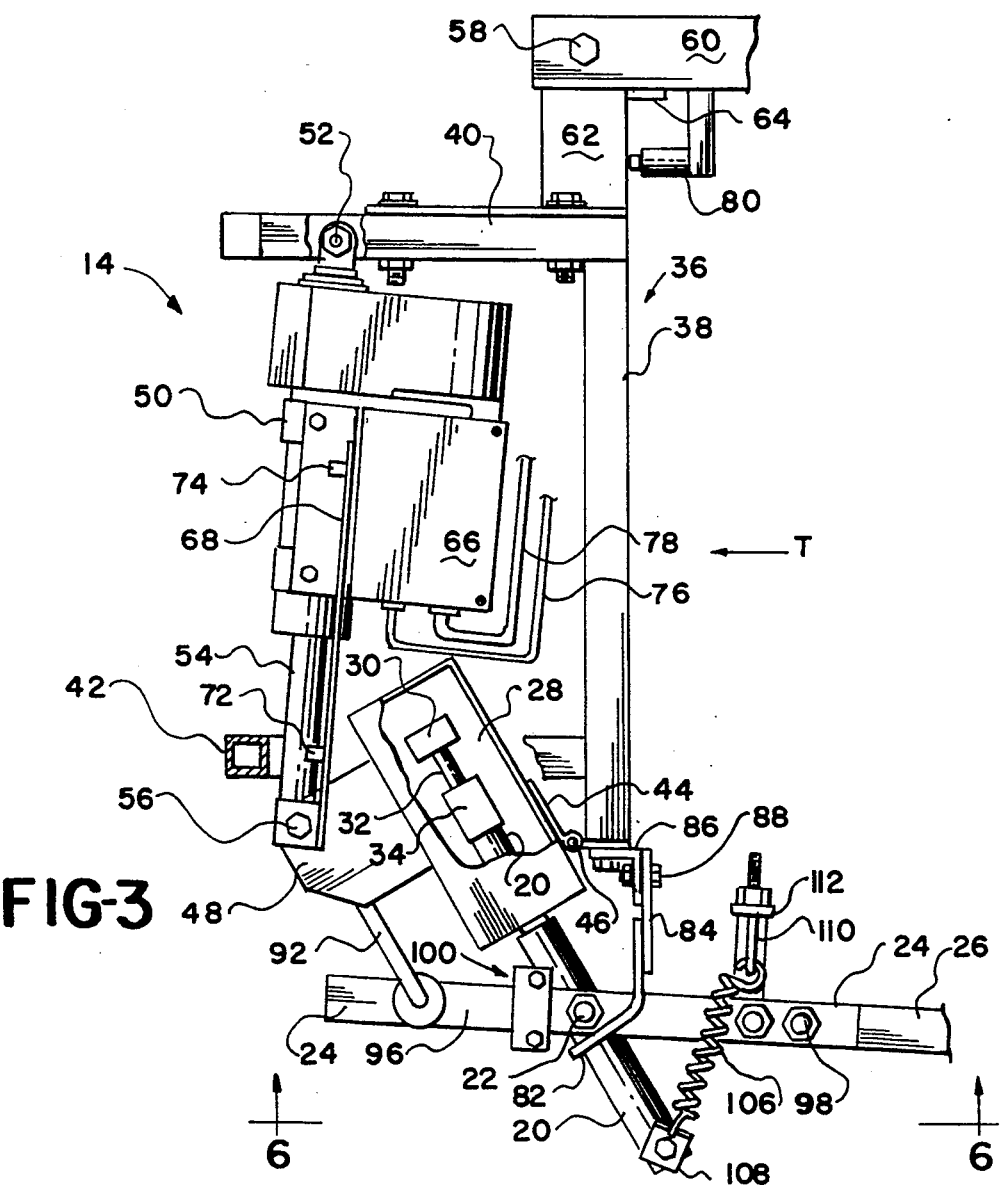
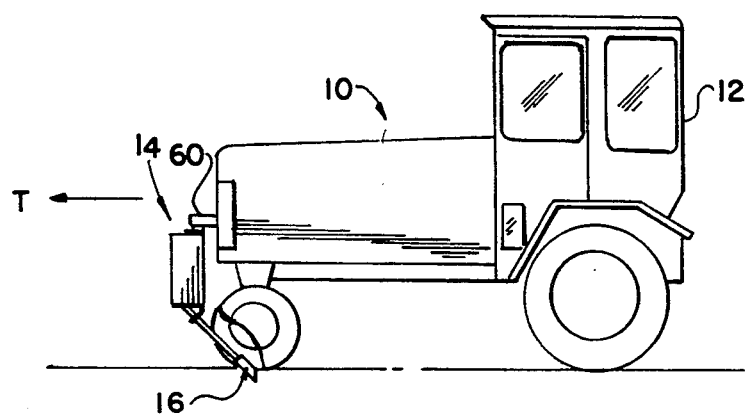

FLIP UP ROW FOLLOWER

BACKGROUND OF THE INVENTION (1) Field of the Invention

This invention relates to guiding farm tractors and more particularly to the mounting of row followers upon the tractors. Farmers have ordinary skill in this art.

(2) Description of the Related Art

U.S. Pat. No. 5,121,799, Barnes and Gary, discloses a row follower with a means for detecting misalignment of the tractor to a path to be followed which is transmitted to guidance of the tractor. The patent discloses a lift system including a cable connected to the shank of the row follower to lift the row follower when the tractor turns, backs up, or otherwise maneuvers.

The row follower shank will be damaged if the row follower is not disengaged from the ground before maneuvering the tractor in turning at the end of a row or by backing up. Normally, if the operation involves earth working, the plows will be lifted when the tractor is turned at the end of the row. However, on certain occasions the tractor may be backed up without lifting the plows and therefore the reversing of the tractor will almost indubitably cause damage to the row follower or to the encoder or other mechanism which detects the deviation and translates it into information used to guide the tractor.

U.S. Pat. No. 5,185,990 to Ronny L. Barnes and Bryan R. Barnes discloses different type row followers but they also indicate that it is common practice at the present time to detect deviation and translate it into electrical signals by an encoder.

Also, the inventors of this application have filed a prior application having the common ownership of this application, disclosing encapsutating the encoder into a sturdy housing with an isolation of the encoder from a shaft to which the row followers are attached. Equipment as disclosed in that application has been in public use before the filing of this application.

U.S. Pat. No. 5,148,873 by Barnes and Ray, disclosed different types of row followers.

SUMMARY OF THE INVENTION

Progressive Contribution to the Art

This application discloses a solution to the problem of preventing damage to the equipment by an improved mounting of the row follower so that the row follower can be raised quickly and easily at any time if the tractor is moving in any direction except the designed direction of travel.

Specifically, this application discloses forming the encoder, encoder shaft, row follower shank and row follower into an assembly. A flip-up solenoid is provided to raise the assembly. Specifically, this assembly is hinged to the mounting bracket by which the row follower is attached to a tractor. An electrical solenoid is mounted to the bracket to rotate the assembly about a horizontal hinge axis which is normal to the direction of travel. Therefore the flip-up solenoid may be readily activated from a switch within the cab of the tractor which may be conveniently activated manually by the operator or activated by shifting the tractor into reverse or activated by raising the plows by the normal process. Also, the mounting bracket is swung to the tractor so that if the tractor is reversed without raising the row follower, the bracket swings away from the tractor rather than damaging the row follower shank.

OBJECTS OF THIS INVENTION

An object of this invention is to protect the row follower and encoder assembly of a tractor guidance system.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWING

FIG. 1 is a side elevational view of an agricultural tractor with an embodiment of this invention attached thereto. The normal earth-working implements have not been shown on the tractor for clarity and conciseness.

FIG. 3 is a side elevational view similar to FIG. 2 with the shank in the carrying or raised or protected position.

Figure 2:
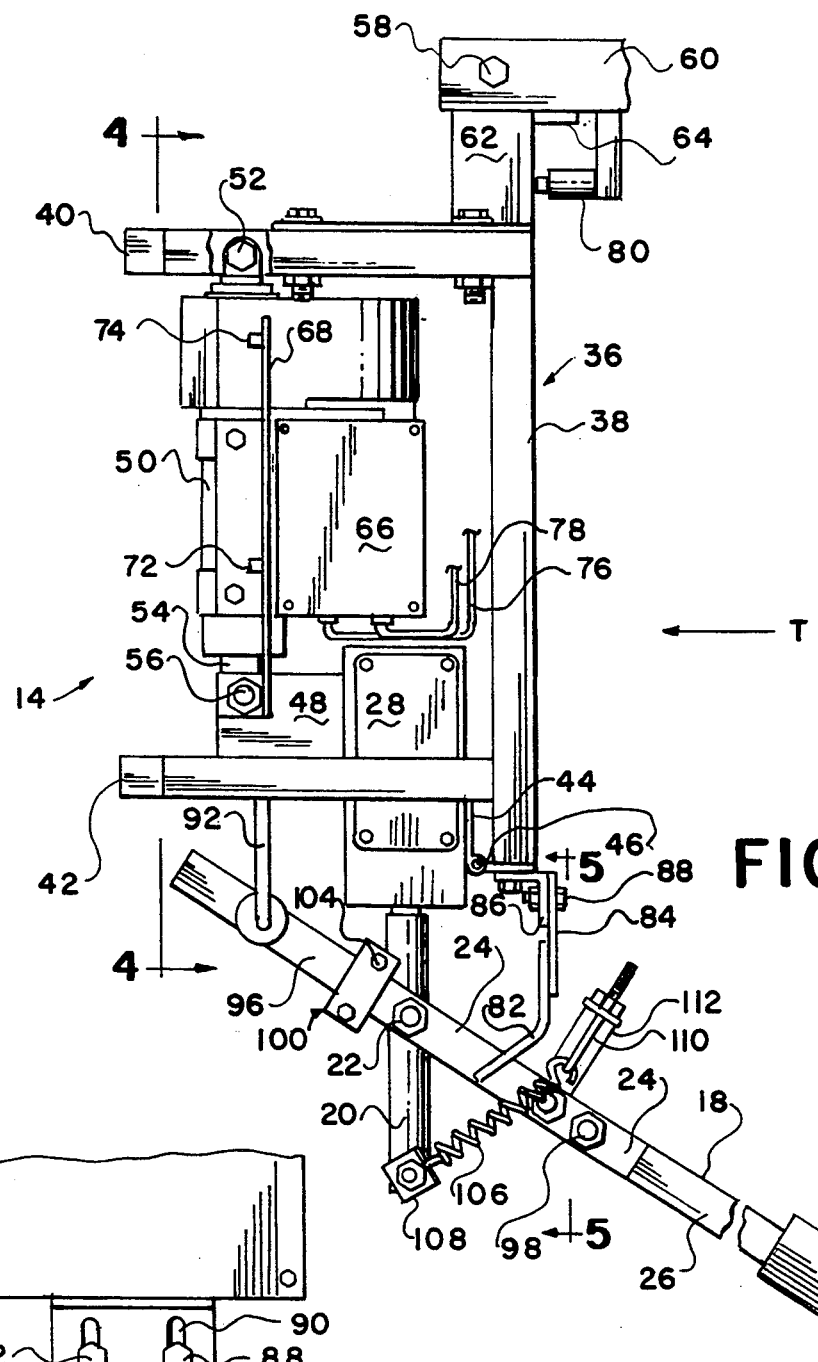
FIG. 2 is a side elevational view of an embodiment of the invention in the operating position with cover plates not shown.

As an aid to correlating the terms of the claims to the exemplary drawing(s), the following catalog of elements and steps is provided:

10 agricultural tractor
12 cab
14 row follower carrier
16 row follower
18 shank
20 pending encoder shaft
22 pivot bolt
24 plates
26 lower portion of shank
28 encoder housing
30 encode
32 direct encoder shaft
34 flexible isolation coupling
36 bracket
38 vertical frame portion
40 top frame portion
42 bottom portion
44 hinge
46 hinge axis
48 ears
50 solenoid body
52 solenoid pivot
54 plunger 56 ear pin
58 carrier pivot
60 arm
62 post
64 stop
66 control box
68 position indicating arm
69 button
70 vertical slot
72 up-limit magnet
74 down-limit magnet
76 main power electrical cable
78 control cables
80 emergency switch
82 prongs
84 fork plate
86 angle iron
88 two bolts
90 slots
92 stabilizer bracket
94 stabilizer springs
96 square structural tube
98 bolts
100 saddle
102 stop plates
104 bolts
106 engagement springs
108 clips
110 adjustable hooks
112 bracket
T direction of travel

DESCRIPTION OF THE PREFERRED EMBODIMENT

Referring to the drawing there may be seen agricultural farm tractor 10 having cab 12. In FIG. 1, one of the front wheels is broken away so that row follower carrier 14 is shown with row follower 16 engaged in the ground. As seen in the drawings the carrier 14 is connected to the front of the tractor 10. Therefore any position on the carrier which is away from the tractor will be referred to in this description as being on the forward portion, and any structure on the carrier which is near the tractor will be referred to as being in the rearward orientation. The row follower 16 is an exemplary showing thereof. Any of many different types of row followers may be used.

The row follower 16 shown is basically a furrow follower. It will be understood by those skilled in the art that row follower could be a stalk wand as shown and described in U.S. Pat. No. 5,148,873 and as is well known to the art.

The row follower 16 is attached to shank 18. The shank is pivoted to pending encoder shaft 20. Pivot bolt 22 extends through the encoder shaft. Also the pivot bolt 22 extends through plates 24.

Lower portion 26 of the shank 18 is constructed of square tubing. The two plates 24 are bolted to the top of the square tubing and straddle the encoder shaft 20. The encoder shaft 20 is, in fact, a tube which is mounted in separate bearings to encoder housing 28. Therefore, the shaft 20 is isolated from encoder 30 which is shock mounted within the housing 28 and direct encoder shaft 32 is connected by an isolation coupling, flexible shock absorbing connection 34 to what is otherwise described as the encoder shaft 20. (FIG. 3) Inasmuch as this structure is described in detail in the prior application identified above as well as being in commercial use on the market, it is not further described here.

Bracket 36 includes vertical frame portion 38, top rectangular frame portion 40, and bottom rectangular frame portion 42. The bracket, including the elements 38, 40, and 42 is a rugged, rigid construction. Assembly hinge 44 is attached to the bottom of the vertical frame portion 38. The hinge includes assembly hinge axis 46 which is horizontal and normal or at right angles to the direction of travel "T" of the tractor 10. The encoder housing 28 is securely attached to the hinge 44 by bolts, welding, or otherwise. Ears 48 is securely attached to the housing 28 on the opposite side of the housing from the hinge 44.

Solenoid body 50 is pivoted by solenoid pivot 52 to the top frame member 40. Plunger 54 of the solenoid 52 is attached by ear pin 56 to the ear 48. As seen particularly in FIGS. 2 and 3, when the plunger 54 is retracted the housing 28 will be vertically oriented and the encoder shaft 20 will depend substantially vertically downward from the encoder housing. This is the operating position as shown in FIG. 2.

However, with the plunger 54 extended the housing 28 will tilt. Thus it may be seen that the solenoid body 50 and plunger 54 form a portion of a means for tilting the assembly, the assembly being the assembly of the encoder housing 28 with the encoder shaft 20 and other equipment connected thereto. The encoder shaft 20 will extend downward and rearwardly to the carry position as illustrated in FIG. 3.

Figure 4:
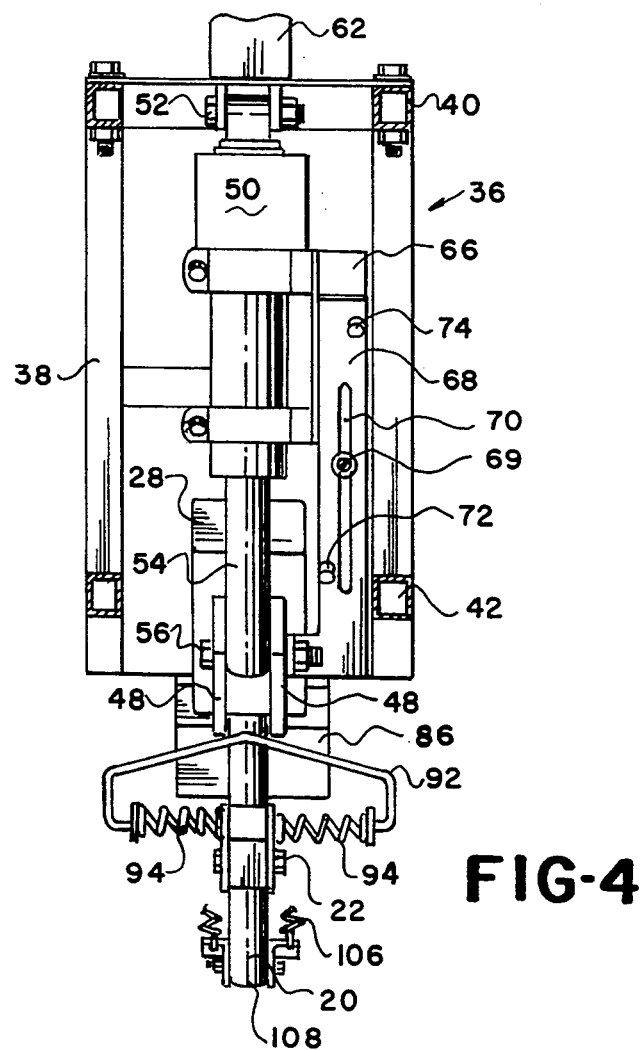
FIG. 4 is a front elevational view taken substantially on line 4—4 of FIG. 2.
Figure 6:
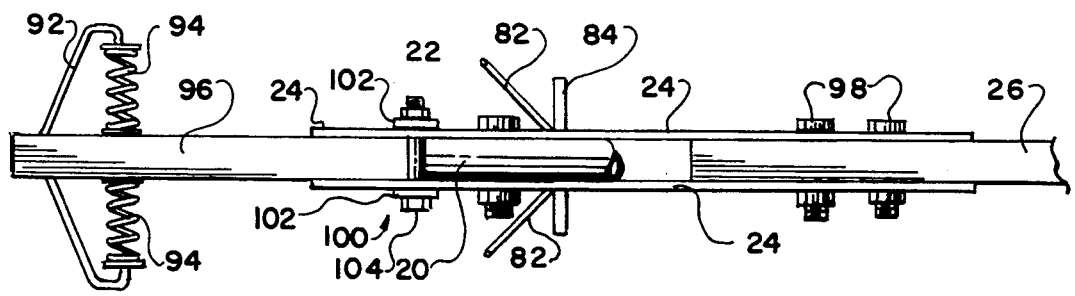
FIG. 6 is a bottom plan view taken substantially on line 6—6 of FIG. 3 with the engaging springs connections not shown for clarity.

Carrier pivot 58 is attached by arm 60 to the tractor 10. The arm 60 is securely attached to the tractor 10 by conventional structure as would be within the skill of those in the art. The carrier pivot 58 is mounted substantially horizontal and normal or right angles to the direction of travel "T". Post 62 is attached to the top frame portion 40 aligned with the vertical frame portion 38 as seen in FIGS. 2, 3, and 4. The bracket 36 is free to swing upon the carrier pivot 58. As seen in FIGS. 2 and 3, its counterclockwise rotation is limited by stop 64 which is attached as by welding to the arm 60. This stop position will normally stop the carrier with the vertical frame portion in substantially vertical orientation. As may be seen by FIGS. 2 and 3, the weight of the carrier will mainly be forward (in the direction of travel) of the vertical frame portion 38. Therefore the normal position of the carrier and vertical frame portion will be vertical as stated before because of the position of the center of mass of the carrier.

Control box 66 is connected to the solenoid body 50. The control box contains the main switches to actuate the plunger 54. I.e., the position of the main switches within the control box 66 will determine whether the plunger is extended or contracted. Position indicating arm 68 is connected to the ear pin 56. It extends upward and adjacent to a forward surface of the control box 66. Vertical slot 70 in the indicating arm 68 permits low friction button 69 connected to the forward face of the control box 66 to maintain the indicating arm 68 in proper relationship to the control box. Up-limit magnet 72 is attached to the indicating arm near the lower portion thereof. The magnet 72 will operate a magnetic switch within the control box 66 to indicate when the plunger 54 is in the upper, retracted position as shown in FIG. 2. Down-limit magnet 74 operates a limit switch within the box 66 behind the magnet 74 as seen in FIG. 3 to indicate when the plunger 54 is in the lower, extended position as seen in FIG. 3. These magnet limit switches (not shown) are connected to the main solenoid switch for its control.

Main power electrical cable 76 extends from the tractor to the control box to furnish the power for the solenoid body 50 as well as the switches within the control box. Likewise, control cables 78 extend from the tractor to the control box 66. The control cables lead to the cab of the tractor so that the indication from the cab may either place the plunger so that the assembly is in the operating condition as seen in FIG. 2, or the carry position as seen in FIG. 3. Normally this indication will be responsive to the position of the power lift lever so that when the power lift lever is in the plows down position, the carrier and row follower will be in the operating position, and when the power lift lever is in the position to raise the plows and maintain them raised, the carrier will be in the carry position as seen in FIG. 3.

The control cables also extend to emergency switch 80. It will be understood that on some occasion the tractor might move rearwardly, which would be the opposite direction to the travel direction as seen by direction of travel arrow "T". It will be understood that if the connections were inflexible damage would result to the shank 18 and possibly to other elements of the row follower, encoder, etc. However, if the tractor were to move in reverse with the row follower in the operating condition it would cause the carrier 14 to pivot away from the tractor about the carrier pivot 58. Probably in this motion there would be rotational movement about the pivot bolt 22 between the shank and the encoder shaft.

When the carrier 14 moved away from the tractor, this would actuate the emergency switch 80 which through its connection to the control cables 78 would cause the plunger 54 to extend thereby moving the encoder assembly to move to the carry position.

It will be understood that the activation of the bracket or emergency switch 80 will supply remedial action responsive to its actuation. The preferred remedial action or response is to move the assembly to a carry position. A second remedial response would be the sounding of am electrical, audible alarm.

The structural arrangement and electrical connections of the switches and controls have not been described in detail for the sake of a concise description. Also, these structural and electrical connections and locations would be within the skill of the art.

Figure 5:
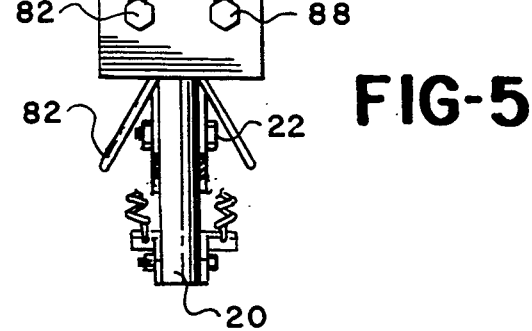
FIG. 5 is a rear elevational view taken substantially on line 4—4 of FIG. 2.

A fork having two prongs 82 depends from fork plate 84. The fork plate is connected to angle iron 86 attached immediately below hinge 44 upon the vertical frame portion 38 of the bracket 36. Two bolts 88 extend from angle iron 86 through slots 90 in the fork plate 84. (FIG. 5) The prongs extend on either side of the shank 18 and limit the deviation the shank may have with respect to being aligned with the direction of travel. It will be understood that the shank 18 and the row follower 16 will normally be aligned with the direction of travel. To keep the shank from swinging wildly when it is in the carry position or otherwise, and to limit the amount of deviation is the function of the fork prongs 82. The prongs are adjustable vertically by the movement of the plate 84 as provided by the slots 90 so that the prongs will be in the proper location relative to the shank 18.

Stabilizer bracket 92 is attached as by welding to the forward portion of the ears 48. The bracket 92 extends downward and to either side of the shank 18. Two stabilizer springs 94 extend between the bracket 92 and the shank 18. Inasmuch as the bracket through its attachment to the ears is also attached to the encoder housing it may be seen that the stabilizer springs are a portion of the interconnection of the encoder housing to the row follower shank 18. These stabilizer springs form a portion of means for biasing the row follower shank to be aligned with the direction of travel. Stated otherwise the stabilizer springs 94 will bias the shank 18 to be positioned at mid-way between the prongs 82. The stabilizer springs 94 are attached to the row follower shank at a point so that pivot bolt 22 is between the row follower 16 and the stabilizer spring attachment.

The shank 18 includes square structural tube 96 which is welded or otherwise connected to the plates 24 at the upper end thereof. The lower portion 26 of the shank 18 is connected to the plates 24 by bolts 98. By this manner the lower portion 26 of the shank may be removed and a replacement with a different type of row follower may be attached. For example a row follower which embodied a stalk wand as is seen in U.S. Pat. No. 5,148,873 might be substituted for the row follower 16 as illustrated which would be a furrow follower.

Saddle 100 is attached to the shank between the pivot bolt 22 and the attachment of the stabilizer springs 94. The saddle includes a pair of stop plates 102 which are clamped to the plates 24 by bolts 104. The upper bolt 104 is located between the shank 18 and the encoder shaft 20.

Stated another way, the upper bolt 104 is a structure on the saddle 100 extending to a position between the encoder shaft and the shank thereby limiting the downward movement of the row follower 16 relative to the encoder shaft 20. This is important when the equipment is in the carry position as seen in FIG. 3. Also, if a certain type of row follower such as the stalk wands are used, it is desirable that the stalk wands do not ride upon the soil but are positioned slightly above the earth to contact the stalk of the row of crops. Normally the stops of the saddle will be in contact with the encoder shaft because of the action of engagement springs 106. The engagement springs extend from clips 108 attached to the distal end of the encoder shaft 20 to a position of adjustable hooks 110 which are carried by bracket 112 attached to the shank 18. Thus it may be said that the engaging springs 106 connected to the shank between the pivot bolt 22 and the row follower 16 and to the distal end of the encoder shank. The engagement springs 106 are tension springs and therefore they will bias the row follower downward, which is to say that they will bias the stops 104 on the saddle 100 against the encoder shaft.

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as my invention:

1. The method of attaching and operating a row follower assembly to an agricultural tractor having a direction of travel comprising the following steps:

a) connecting a mounting bracket to the tractor, b) forming the row follower assembly by
   i) attaching a row follower to a row follower shank,
   ii) pivoting the shank to an encoder shaft,
   iii) attaching the encoder shaft to an encoder,
   iv) encasing the encoder within an encoder housing, and
c) hinging said encoder housing to said bracket, thereby
c') hinging said assembly to the bracket about a hinge axis normal to the direction of travel.

2. The method as defined in claim 1 with the additional steps comprising:
   d) tilting the assembly on the hinge thereby
   e) raising the row follower.

3. The method as defined in claim 1 further comprising:
   d) swinging the mounting bracket by a bracket pivot to the tractor thereby performing said connecting step, so that
   e) reversing the direction of travel of the tractor with the row follower down results in
   f) swinging the bottom of the mounting bracket in a forward direction relative to the tractor.

4. The method as defined in claim 3 further comprising:
   g) placing a bracket switch between the mounting bracket and the tractor so that upon the swinging of the mounting bracket results in
   h) opening the switch, and
   j) applying remedial action responsive thereto.

5. The method as defined in claim 1 further comprising:
   d) biasing the row follower and its shank to a position aligned with the direction of travel.

6. The method as defined in claim 1 further comprising:
   d) biasing the row follower downward.

7. The method as defined in claim 1 further comprising:
   d) limiting the deviation of the shank and row follower from alignment with the direction of travel.

8. The method as defined in claim 1 further comprising:
   d) limiting the downward movement of the row follower relative to the encoder shaft.

9. A row follower carrier for connecting
   a) a row follower attached to
   b) an encoder shaft depending from
   c) an encoder which is mounted by said carrier to
   d) an agricultural tractor having a direction of travel;
comprising in combination with the above:
   e) an encoder housing enclosing said encoder with the encoder shaft pending therefrom,
   f) a horizontal pivot bolt transverse to said direction of travel extended through the encoder shaft,
   g) a row follower shank with the row follower connected to a distal end of the shank,
   h) said shank pivoted to the encoder shaft by said pivot bolt,
   j) a carrier bracket adapted to be connected to an agricultural tractor,
   k) an assembly hinge with a hinge axis adapted to be normal to said direction of travel,
   l) said encoder housing hinged to said carrier bracket by said assembly hinge, and
   m) tilt means for tilting the encoder housing from
      i) an operating position with the encoder shaft pending substantially vertically downward to
      ii) a carrying position with the encoder shaft extending downward and rearward.

10. The structure as defined in claim 9 further comprising:
   n) a stabilizing spring interconnecting the encoder housing and the row follower shank,
   o) said stabilizing spring forming a portion of means for biasing the row follower shank to be aligned with the direction of travel.

11. The structure as defined in claim 10 further comprising:
   p) said stabilizing spring attached to the row follower shank at a point so that the pivot bolt is between the row follower and the stabilizer spring attachment.

12. The structure as defined in claim 9 further comprising:
   n) an engaging spring attached from the encoder shaft to the row follower shank so that the row follower is biased downward.

13. The structure as defined claim 12 further comprising:
   o) said engaging spring connected
      i) to the shank at a point between the pivot bolt and the row follower and
      ii) to the distal end of the encoder shaft.

14. The structure as defined in claim 9 further comprising:
   n) a fork having two prongs pending from said bracket,
   o) said shank spaced between said prongs so that said prongs limit the deviation of the shank from alignment with the direction of travel.

15. The structure as defined in claim 14 further comprising:
   p) a stabilizer spring interconnecting the stabilizer shank and the encoder housing so that the stabilizer spring biases the shank to a position mid-way between the prongs of the fork.

16. The structure as defined claim 9 further comprising:
   o) a carrier pivot attached to the tractor,
   p) said carrier pivot substantially horizontal and normal to the direction of travel,
   q) said carrier bracket connected to said carrier pivot thereby swinging the carrier bracket to an agricultural tractor,
   r) said hinge axis of said assembly hinge substantially parallel to said carrier pivot so that with the row follower engaged with the ground and the tractor moving in reverse the bracket will move forward with respect to the tractor.

17. The structure as defined in claim 16 further comprising:
   s) a switch mounted between the bracket and the tractor so that movement of the bracket forward with relation to the tractor activate said switch,
   t) said switch electrically connected to said tilt means.

18. The structure as defined in claim 17 wherein said
   u) tilt means includes
   v) an electrical solenoid interconnecting said carrier bracket and said encoder housing.

19. The structure as defined in claim 18 further comprising:
   w) a saddle adjustably connected to said shank,
   x) said pivot bolt between said saddle and said row follower,
   y) said saddle having structure extending to a position between the encoder shaft and the shank thereby limiting the downward movement of the row follower relative to the encoder shank.

* * * * *